A. LEONARD.
Casting Thimble Skeins.
No. { 124, / 1,228. }
Reissued Oct. 8 1861.
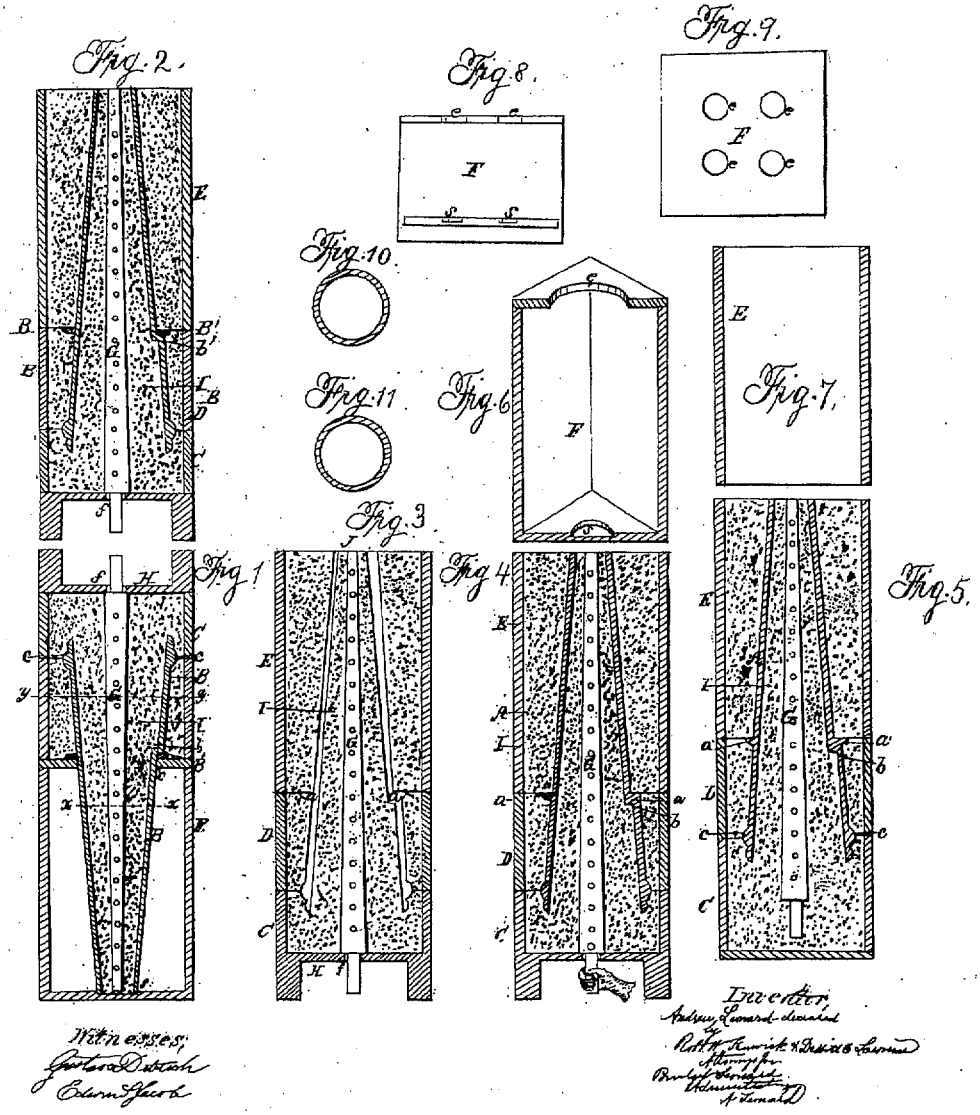
N. PETERS, PHOTO-LITHOGRAPHER, WASHINGTON, D. C.

UNITED STATES PATENT OFFICE.

BRIDGET LEONARD, OF KENOSHA, WISCONSIN, ADMINISTRATRIX OF ANDREW LEONARD, DECEASED.

IMPROVED MODE OF CASTING SEAMLESS SKEINS FOR WAGONS.

Specification forming part of Letters Patent No. 16,688, dated February 24, 1857; Reissue No. 575, dated July 27, 1858; Reissue No. 1,228, dated October 8, 1861.

*To all whom it may concern:*

Be it known that A. LEONARD, deceased, late of the city and county of Kenosha, and State of Wisconsin, did invent a new and useful Improvement in Molding Cast Thimble-Skeins for Axles, of which the following is a full, clear, and exact description, reference being had to the accompanying drawings, forming part of this specification, in which—

Figure 1 is a vertical central section of the patterns, core-bar, guide-flask, and two of the sand-flasks inverted and partly molded up with sand. Fig. 2 is a similar section showing the patterns and core-bar and three sand-flasks wholly molded up with sand, the supporting or guide flask having been removed and its place supplied by a sand-flask, the position of the parts having also been reversed. Fig. 3 is a similar section, the patterns having been removed and the sand core sprung out of true. Fig. 4 is a similar section, the sand core having been centered and the metal poured into the mold. Fig. 5 is a similar section showing a slight modification of the improvement. Fig. 6 is a perspective sectional view of the supporting or guide flask adapted for one mold. Fig. 7 is a section of the sand-flask which is substituted for the supporting or guide flask. Figs. 8 and 9 are plan and sectional views of a guide or supporting flask adapted for four molds. Fig. 10 is a section of a seamless thimble-skein produced by improvement of A. LEONARD. Fig. 11 is a section of a thimble-skein with seams or ribs, produced by the old method of molding.

Similar letters of reference in each of the several figures indicate corresponding parts.

The nature of this part of ANDREW LEONARD'S invention consists—

First. In producing the core for giving the internal form of the axle-skein, and the mold for giving the external form of the butt of said skein, by employing, in combination with sections of a horizontally-divided vertical flask, an inverted vertical pattern, made tubular, and with an external and internal shoulder, substantially as hereinafter described.

Second. In producing the mold for giving the external form of the wearing-surface of the skein, by employing, in combination with the shouldered pattern and two sections of the sand-flask, an additional section of sand-flask, substantially as hereinafter described.

Third. In producing an unbroken impression in sand for the external shoulder of the thimble-skein, by employing a pattern which is made in two parts, so that in withdrawing the sand-flasks, for the purpose of removing the pattern, the collar may be moved out of the way, and thus destruction of the mold prevented. It is the principle of operation embodied in the means, rather than the means themselves, that constitutes ANDREW LEONARD'S invention under this head, which principle of operation is the rendering practicable the withdrawal of the second section of the sand-flask in a vertical position without breaking the mold.

Fourth. In so molding up the sand in the lower section of the flask and in the tubular core-pattern that the vertical green-sand core forms a part of the sand mold of the exterior of the axle-skein, and thus the parts of the mold which give the form of the interior and exterior of the skein united as one afford a firm support to the base of the core by the sand mold.

Fifth. It consists in holding in true position or centering the green sand cores by employing, in combination with the means hereinafter specified, vertical core-bars, said bars being partly or wholly molded up in the sand.

Sixth. In the production of a green-sand mold which will turn out a seamless finished collared or shouldered cast thimble-skein by means substantially such as hereinafter described, or the equivalent thereof.

To enable others skilled in the art to perform with ANDREW LEONARD'S invention, a description of the same with reference to the drawings will now be given.

B is a pattern of taper form longitudinally, and cylindrical transversely, in the line $x$ $x$, and elliptical in the line $y$ $y$. An eccentric shoulder, $b'$, is formed on its outer circumference, and on its inner circumference a shoulder, $b^2$, is formed. There is also a bead, $c$, formed on the outer surface of the elliptic or butt portion of the pattern. This pattern is used in a vertical position, and forms the

BEST AVAILABLE COPY impression for the interior and exterior of the skein A, excepting the collar *a*.

B′ is a loose pattern, of ringform, fitted over the small portion of the tubular pattern, and snugly up against the shoulder *b′* of the pattern. This ring-pattern gives the form or impression for the collar *a* of the skein. It is essential to have the pattern B B′ made in two parts, in order that one part may be moved out of the way when it is desired to move up and away the second section, D, of the sand mold. It is immaterial how the end is secured, so long as the projection part B′ is moved out of the way and offers no obstruction to the sand in section D when said section is raised.

C D E F is a box or other shaped flask, formed of a series of sections, one of which, F, serving as a pattern guide and support during a certain stage of the operation, and then going out of use to make place for the section E, as will be presently described. The dividing-lines of the several sections all run horizontally.

G is a vertical semicircular hollow core-bar for supporting or centering the green-sand core whenever it gets out of true.

The manner of operating with the means described is as follows: First arrange the open section F in proper position, and arrange ring-patterns B′ on its top and concentric with guide-holes *e e e e* therein. Then insert small ends of patterns B through the ring-patterns and holes until the shoulders *b′* fit snugly against the ring-patterns and the ends of tubular patterns enter circular recesses *s* in the bottom board of section F, as shown in Fig. 1. The pattern B B′ being now centered and steadily confined, the section D is placed on top of section F, and within it sand is placed and rammed tightly all round the butt or elliptical portion of the pattern up to the center of the bead *c*. After molding section F up properly and putting on parting-sand, section C is placed on top of D, as shown in the drawings, Fig. 1, and into it sand is placed and rammed tightly. Some sand or mold is also thrown into the tubular pattern B at this stage and the core-bars G adjusted centrally in said patterns. Then the operation of filling the patterns and ramming the sand is continued until the sand rises level with the upper edge of section C. The sand thus rammed in the sections C and D and in the tubular pattern is confined by means of a board, H, said board having holes *f* through it for the passage of the core-bars, and also having cleats on its upper surface for the purpose of holding the board elevated above the floor or ground when the flask is inverted, as shown in Fig. 2. When the operation has proceeded to the extent shown in Fig. 1, the several sections are firmly clamped together and the whole inverted, as shown in Fig. 2, from the position shown in Fig. 1, so that the largest end of the pattern B B′ is down and molded in sand, while the smallest end is up and uncovered with sand in the open section F of the flask. The clamps are then removed and the open section F lifted off, its use as a support and guide to the pattern B B′ being no longer necessary. The removal of section F makes room for section E, and as the sand has only been molded up to the flat surface of the collar B′ of pattern B, it is necessary to place section E on section C, but before doing so parting-sand is sprinkled on the molded sand in section C. All now being ready, put the sand in section C and ram it until it rises even with the edge of section C, as represented in Fig. 2. This being done, the next part of the operation, is to apply the cope, (not shown,) with other parts, for the purpose of finishing the small end of the mold, so that it will form a screw-thread on the small end of the skein; but as this latter part of the operation does not constitute a part of the improvement in skeins that ANDREW LEONARD claimed under his former patent it is not deemed necessary to represent it here. It also is now commonly practiced in molding axle-skeins, and will be readily understood.

To remove the pattern without injuring the impression formed by it, lift off the cope, (not shown,) then section C, known as the "cheek-piece," then the loose ring part B′ of pattern B, and then the section D, known as the "lower cheek-piece." Said parts being removed, the tubular pattern B can be moved up over the sand core of the mold. The ring part B′ of the pattern and the tubular part B having been removed, the sand core of the mold remains standing in a vertical position, and has for its support a portion of the sand-mold which has the external impression of the skein formed in it, as shown in Fig. 3. The sections E and D, with sand mold in them, are readjusted to their positions, as shown in Fig. 4, and when thus adjusted they, in connection with section C and the core I, form the mold for the entire skein, excepting the screw-threaded ends of the skein, as shown. In the event of the core I springing out of true laterally at its upper end, as illustrated at J, the molder takes hold of the lower end of the core-bar and adjusts the core to the true condition, (shown in Fig. 4,) he being enabled to make the adjustment accurately by keeping his eye on the uncovered upper end of section E. After the adjustment is made the "cope," (not shown,) with mold for forming the screw-threaded end of skein, is placed on top of section E. All now being completed, the molten metal is introduced through a gate (near the base of the mold) into the mold, and the seamless collared and shouldered thimble-skein A, (shown in Figs. 4 and 5,) with the addition of a screw-thread (not shown) on its small end, is the result of the whole operation.

In Fig. 7 the core-bar extends down into the solid sand, the section C of flask being lengthened for that purpose. The end of the bar thus molded in the sand will afford support to the core, and thus tend to prevent springing or inclining out of the center of the core when the pattern is withdrawn. It however is far preferable to have the core-bar extend outside of the flask, so that the core may be adjusted by hand.

The invention of ANDREW LEONARD accomplishes an object never before attained—viz., the production of seamless cast thimble-skeins perfect and true direct from the mold, constituting them, as set forth and claimed in another patent of even date with this, a new manufacture in contradistinction to thimble-skeins made from half-patterns, which leave longitudinal seams on the wearing surface or arm thereof, as well as those made seamless and less durable by turning or filing off the seams or ribs and the hard or chilled wearing-surface. A further object secured is the reduction, to a considerable extent, of the cost of manufacturing thimble-skeins, the molder being enabled to mold a full set in one flask of LEONARD'S construction in about the same time that it requires for a single skein with ordinary half-patterns and dry-sand cores; and besides this, the quantity of sand required is greatly reduced and the cores can be built up of green sand, and as the cores are part of the mold which gives the external impression of the skein, there is less danger of losing castings; and, finally, as the skeins are seamless on their inner surfaces as well as on their outer surfaces, the labor of fitting them on wood axles is also much diminished.

What is claimed as the invention of ANDREW LEONARD, deceased, and desired to be secured by Letters Patent, is—

1. The manner, substantially as herein described, of producing the core I, which gives the internal form of the axle-skein, and that part of the mold which gives the external form of the butt thereof.

2. The manner, substantially as herein described, of producing that part of the mold which gives the external form of the wearing part of the thimble-skein.

3. The manner, substantially as herein described, of producing an unbroken impression in sand of the external shoulder, *a*, of the axle-skein.

4. The manner, substantially as herein described, of uniting the base of the green-sand core with the lower section of the sand-mold, which gives the external form to the thimble-skein.

5. The manner, substantially as herein described, of holding in true position or centering the green-sand cores.

6. The manner, substantially as herein described, of producing, as a whole, a sand mold which turns out in the one operation of casting a finished, seamless, and shouldered cast thimble-skein.

Witness my hand this 10th day of July, 1861, in the application for reissue of ANDREW LEONARD'S patent for improvement in casting seamless thimble-skeins.

BRIDGET LEONARD,
*Administratrix of Andrew Leonard, deceased.*

Witnesses:
R. A. PHELAN,
THOS. ENGLISH.